(12) United States Patent
Cerutti et al.

(10) Patent No.: US 6,808,062 B2
(45) Date of Patent: Oct. 26, 2004

(54) PLANT AND METHOD FOR ORDERLY ALIGNING PRODUCTS IN ROWS ALONG A PACKAGING LINE

(75) Inventors: Giuliano Cerutti, Borgomanero (IT); Pierre Menegaldo, Borgosesia (IT); Filippo Barbweris Organista, Trivero (IT)

(73) Assignee: SASIB Packaging System S.p.A., Cressa (IT)

( * ) Notice: Subject to any disclaimer, the term of this patent is extended or adjusted under 35 U.S.C. 154(b) by 0 days.

(21) Appl. No.: 10/264,304

(22) Filed: Oct. 3, 2002

(65) Prior Publication Data

US 2003/0079962 A1 May 1, 2003

(30) Foreign Application Priority Data

Oct. 4, 2001 (EP) .............................................. 01830628

(51) Int. Cl.⁷ .............................................. B65G 47/26
(52) U.S. Cl. ..................... 198/434; 198/460.1
(58) Field of Search ............................. 198/434, 459.1, 198/460.1, 461.1, 419.3

(56) References Cited

U.S. PATENT DOCUMENTS

| | | | | |
|---|---|---|---|---|
| 2,888,125 A | * | 5/1959 | Engelson et al. ........ | 198/459.1 |
| 3,187,873 A | * | 6/1965 | Wolff ...................... | 198/461.1 |
| 3,335,841 A | * | 8/1967 | Klingel et al. ........... | 198/460.1 |
| 4,101,020 A | | 7/1978 | Langen | |
| 4,134,485 A | * | 1/1979 | George ...................... | 198/434 |
| 4,552,261 A | * | 11/1985 | Raudat et al. ........... | 198/419.3 |
| 4,892,181 A | * | 1/1990 | Hogenkamp ................ | 198/434 |
| 4,934,509 A | * | 6/1990 | Gilgien .................... | 198/460.1 |
| 5,060,783 A | | 10/1991 | Chenevard et al. | |

FOREIGN PATENT DOCUMENTS

| | | |
|---|---|---|
| DE | 3841240 A1 | 1/1990 |
| EP | 0806383 A | 11/1997 |

* cited by examiner

Primary Examiner—Joseph Valenza
(74) Attorney, Agent, or Firm—Gibbons, Del Deo, Dolan, Griffinger & Vecchione

(57) ABSTRACT

A plant and a method for carrying out orderly arrangement of products in ranks along a packaging line, wherein an alignment device is set between a first conveyor belt and a second conveyor belt. The products arrive on the first belt in ranks with substantially disorderly transverse alignment and with longitudinal distances that may vary between the said ranks, and are accelerated to obtain, on the second belt, ranks aligned in an orderly way and properly spaced from one another.

21 Claims, 7 Drawing Sheets

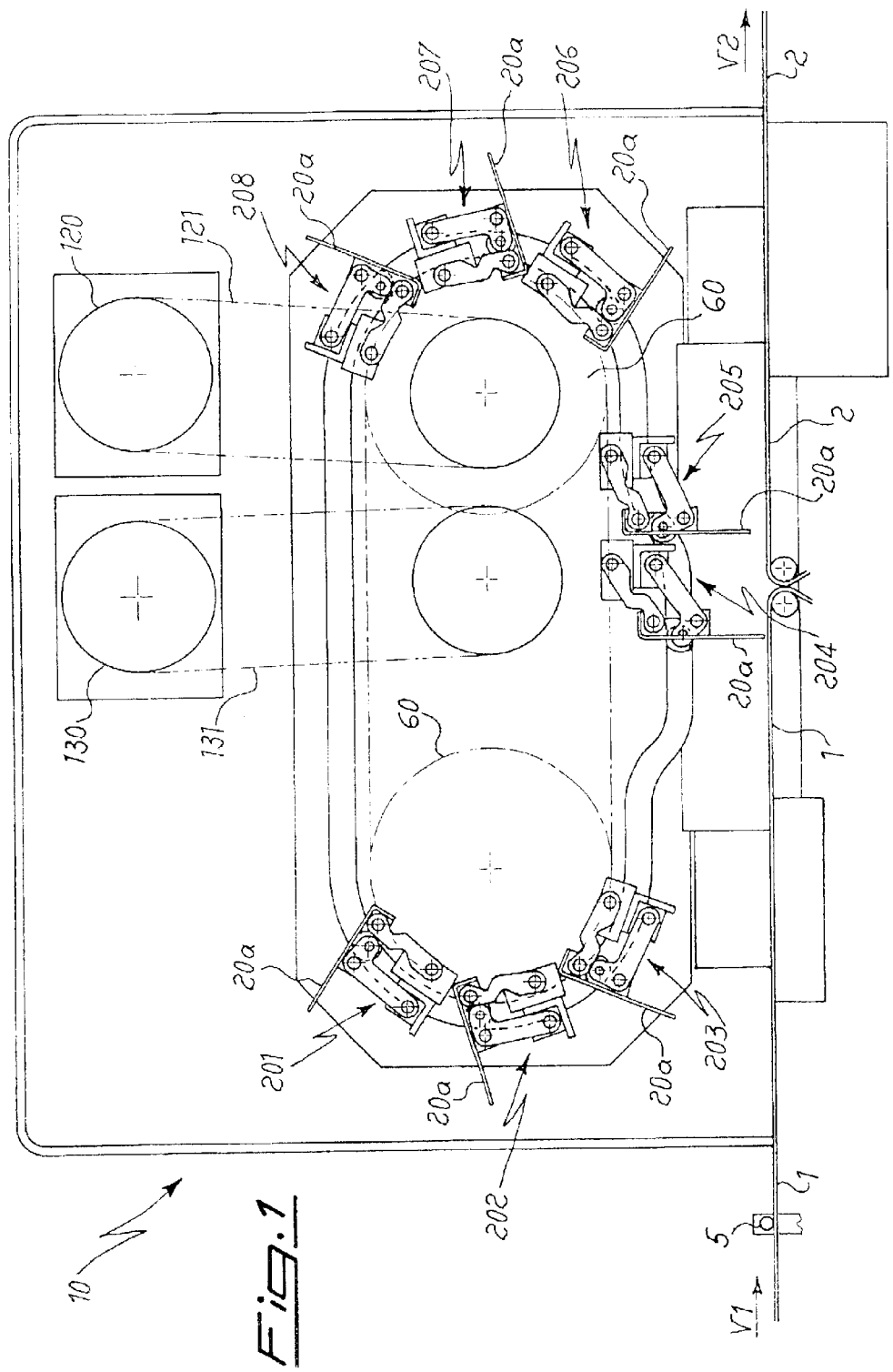

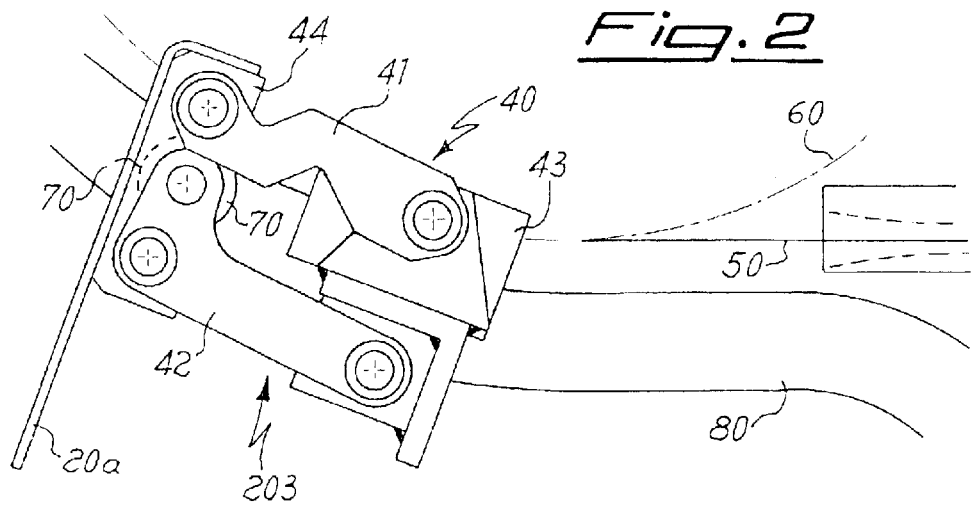
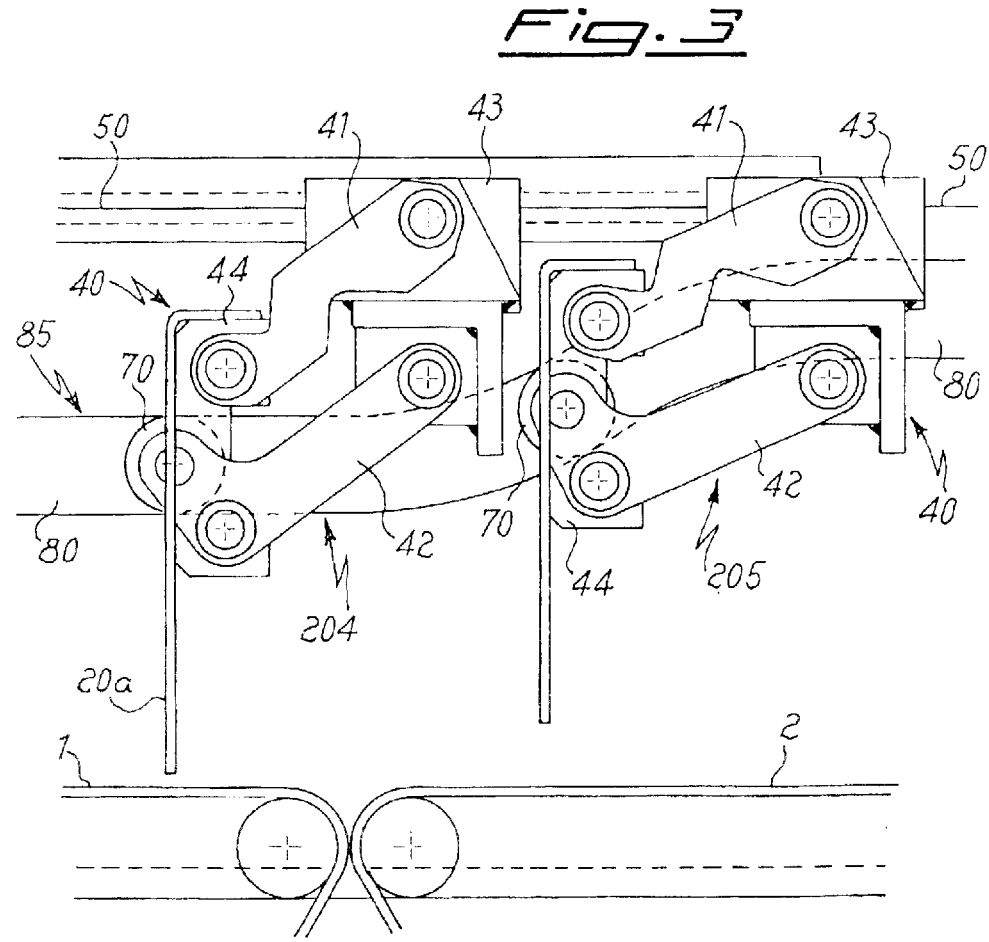

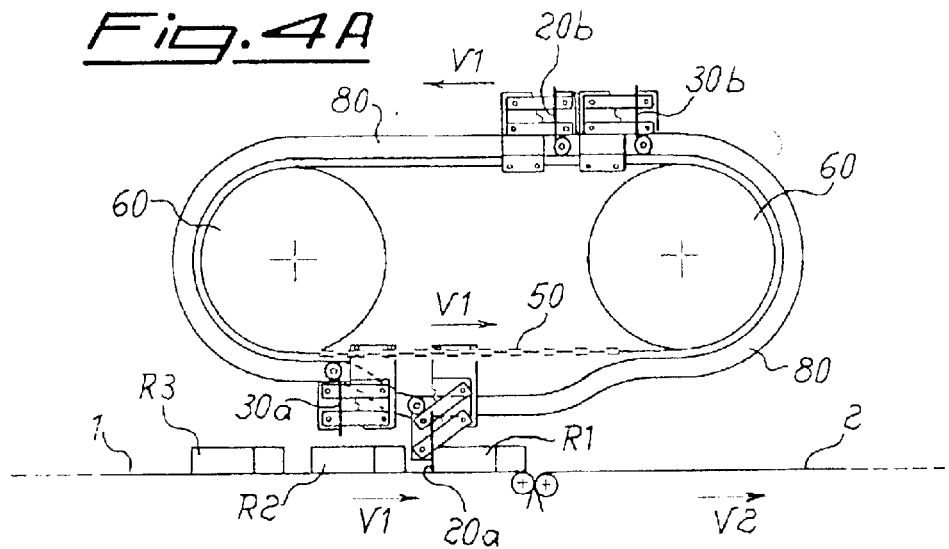
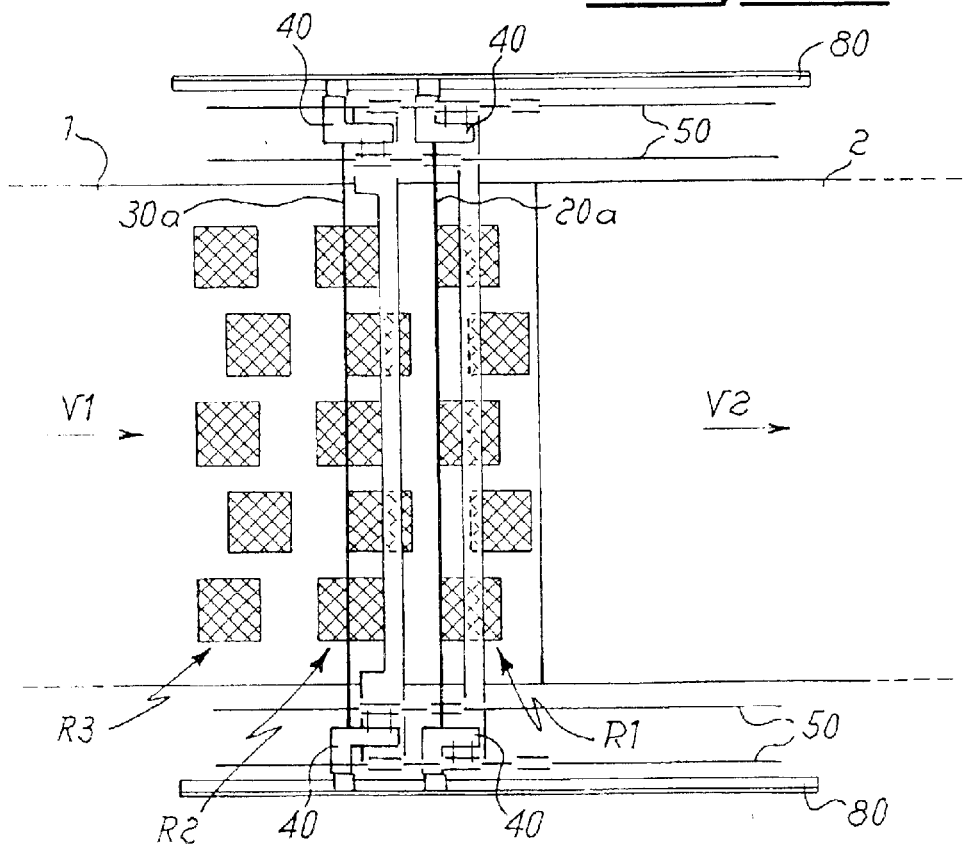

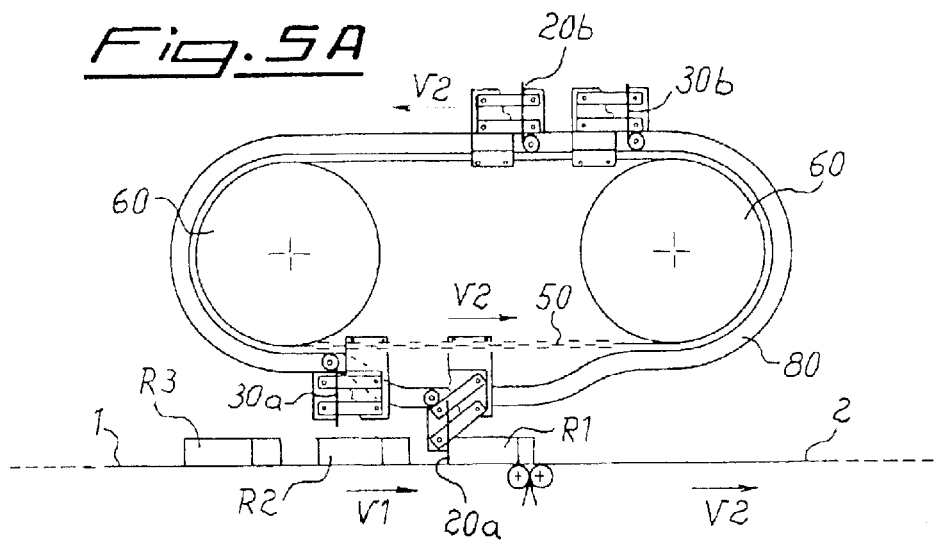
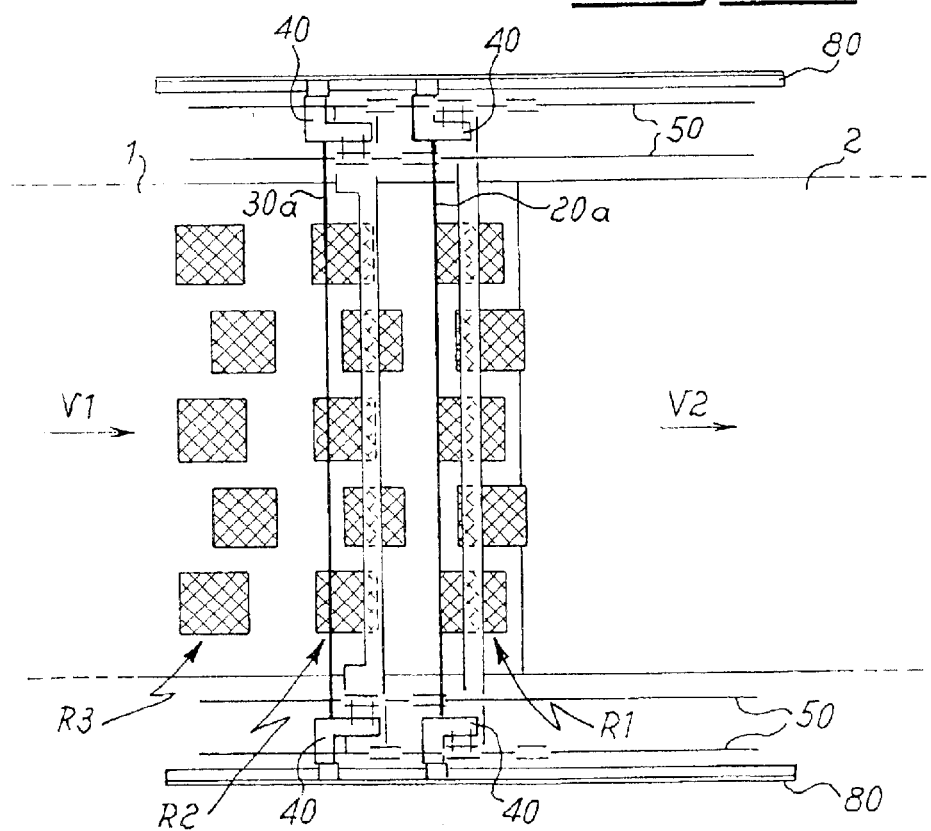

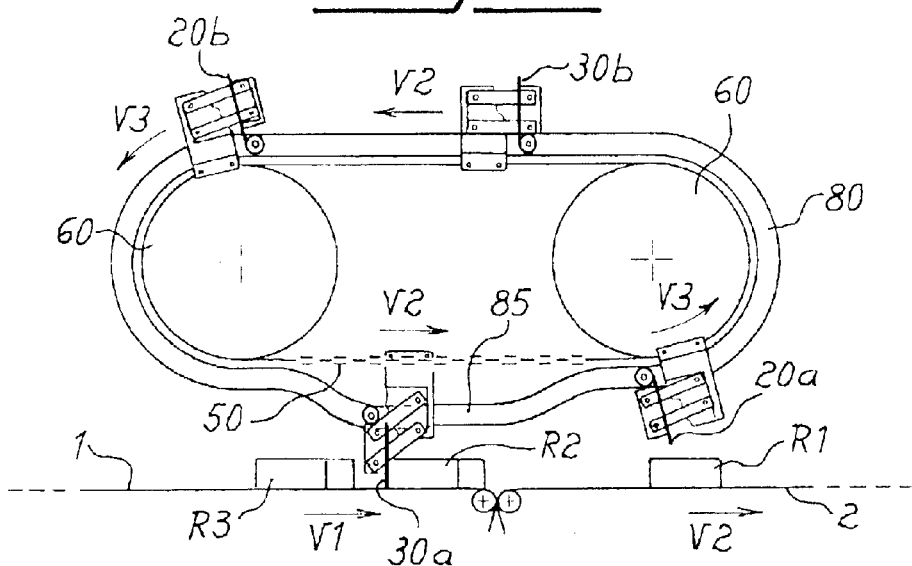
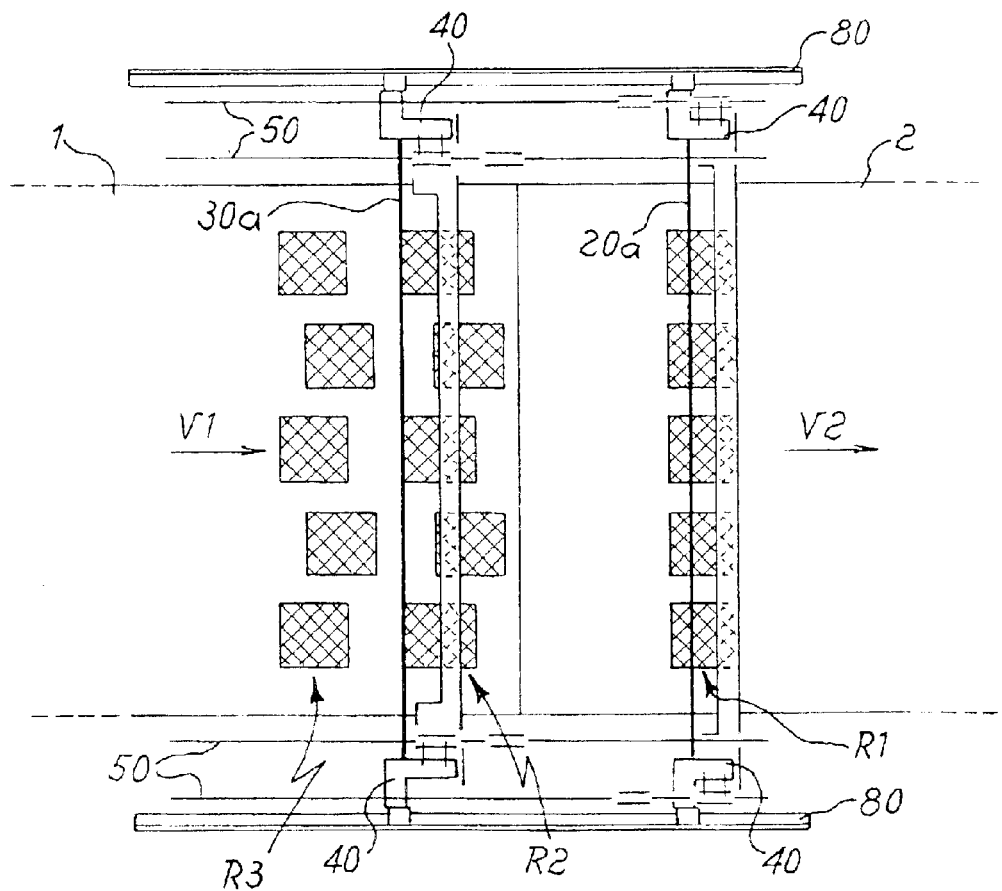

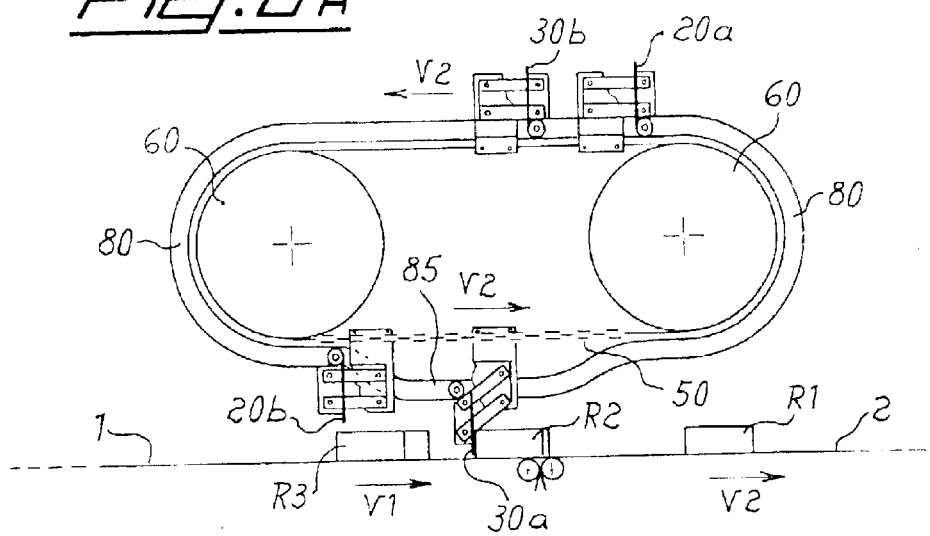
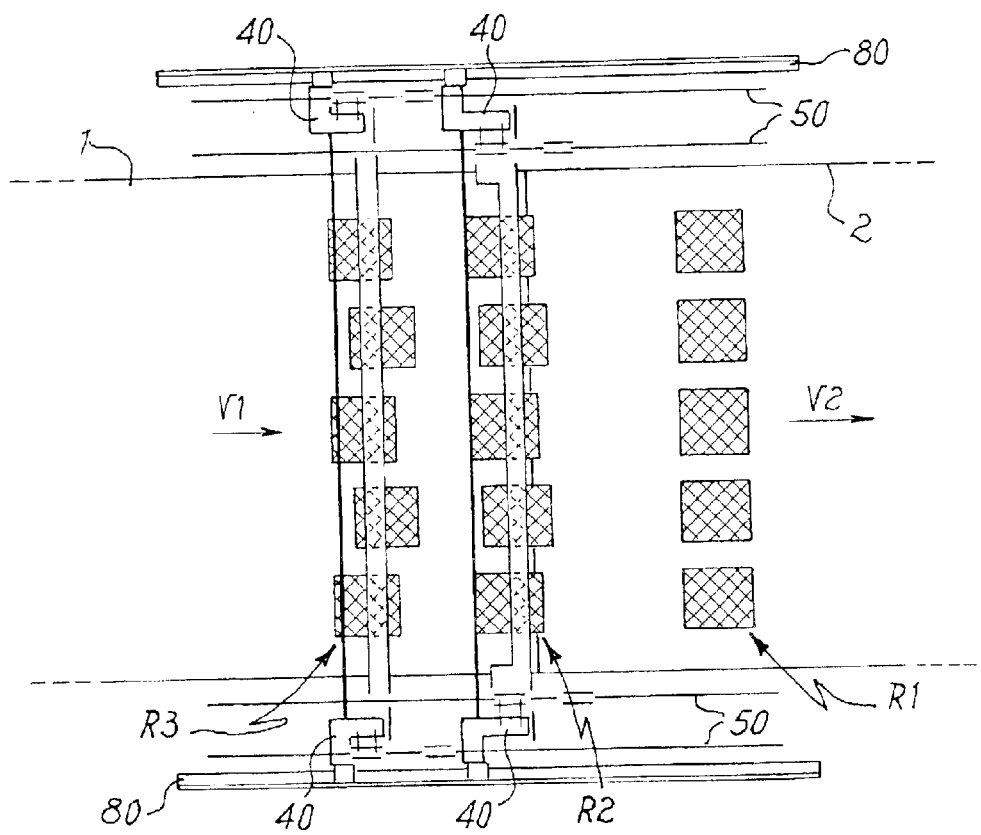

PLANT AND METHOD FOR ORDERLY ALIGNING PRODUCTS IN ROWS ALONG A PACKAGING LINE

BACKGROUND OF THE INVENTION

1. Field of the Invention

The present invention relates in general to a plant and a method for carrying out orderly arrangement of products in ranks along a packaging line.

In particular, the invention relates to packaging systems in which the products are arranged on a first conveyor belt according to ranks having substantially disorderly transverse alignment and with longitudinal distances that may vary between said ranks. From this first conveyor belt, the ranks must be transferred onto a second conveyor belt according to orderly ranks in a transverse direction and must be spaced longitudinally at pre-set distances.

2. Discussion of Related Art

The term "longitudinal" is meant, here and as follows, the direction parallel to the direction of advance of the conveyor belts. The term "transverse" is meant, here and as follows, the direction perpendicular to the longitudinal one.

A possible example of non-limiting application of the present invention is that of plants for packaging baked products coming from an oven in the foodstuff industry. The conditions of feed in ranks occur, in fact, downstream of an oven for the baking of foodstuff products, such as small cakes, tarts or the like, in which the-products at output from the oven are deposited according to irregular ranks on a conveyor belt for the subsequent steps of selection and packaging. Prior to the packaging step, the products must in any case arrive aligned in regular ranks and must be spaced at equal pre-set distances.

To obtain alignment of the products in ranks, as well as the right spacing as required, it is known to cause the products, which are possibly pre-selected, to advance in disorderly ranks up to a pair of conveyor belts, with the upstream conveyor belt operating in an intermittent or in a continuous way, and the downstream conveyor bell generally operating in a continuous way. At each rank of products which is transferred from the upstream conveyor belt to the conveyor belt immediately following it, a transverse blade drops down and temporarily stops the products until a rank is obtained that is perfectly aligned and spaced from a rank already present on the same downstream belt.

It is evident that this type of solution does not enable high rates of production to be sustained. This drawback is even more important in the cases where, according to the type and dimensions of the products, the orderly ranks must be spaced at intervals from one another at a considerable distance.

SUMMARY OF THE INVENTION

In general, one aspect of the present invention to provide a plant and a method that enable orderly arrangement of products in ranks along a packaging line to be carried out in an extremely fast way. Another aspect of the present invention is to provide a plant and a method such as the ones cited above, which enable a high productivity to be sustained irrespective of the distance that it is desired to obtain between the ranks of the products.

These aspects are achieved by the present invention, which relates to a plant for carrying out orderly arrangement of products along a packaging line, of the type comprising at least one alignment device arranged along the packaging line, and wherein the packaging line comprises at least one first conveyor belt, arranged upstream of the at least one alignment device, on which the products are set in ranks with substantially disorderly transverse alignment and with longitudinal distances that may vary between the ranks themselves, and at least one second conveyor belt, arranged downstream of the at least one alignment device, on which the products must be set aligned according to orderly ranks spaced at pre-set distances, characterized in that the alignment device comprises means for accelerating the ranks of products during their passage from the first conveyor belt to the second conveyor belt.

In this way it is possible to obtain alignment of the products in orderly ranks and proper spacing thereof without affecting the rate of arrival of the ranks at the alignment device, or in other words, irrespective of the rate of production.

The means for accelerating the ranks of products comprise one or more blades set in motion along at least one respective pre circuit by means of a motor driven in a controlled way. Each blade, while accelerating a rank, also aligns the products of the rank itself and accompanies them on the second conveyor belt.

The second conveyor belt is driven in motion at a higher speed than the first belt. By varying the speed between the conveyor belts, it is thus possible to obtain proper spacing between successive ranks of products.

According to a possible embodiment of the present invention, the means for accelerating the ranks of products comprise one or more distinct circuits, on each of which at least two blades are set in motion. The blades of one circuit are preferably set in motion by a motor controlled independently of the motor associated to another of said circuits.

In this way, at least one blade along one of the two circuits is always ready to intervene for carrying out alignment of a rank that is arriving at the alignment device when a blade associated with the other of he two circuits is carrying out alignment of a rank that arrived at an immediately preceding instant.

Each plant may of course be equipped also with two or more alignment devices, each set between consecutive conveyor belts, which are driven at different speeds. This allows to space ranks at increasing distances until, for example, a desired particularly long interval is obtained between one rank and the next, or else intervals that are in any case more reduced can be obtained without having to force the acceleration of the products during the subsequent steps of alignment/spacing.

The invention also relates to a method for carrying cut orderly arrangement of products along a packaging line by means of at least one alignment device arranged along the packaging tine, wherein the packaging line comprises at least one first conveyor belt, arranged upstream of the above-mentioned at least one alignment device, on which the products are set in ranks with substantially disorderly transverse alignment and with longitudinal distances that may vary between the ranks, and at least one second conveyor belt, arranged downstream of the at least one alignment device, on which the products must be set aligned according to orderly ranks spaced from one another at pre-set distances, characterized by providing acceleration of the ranks of products during their passage from the first conveyor belt to the second conveyor belt.

The method envisages, in particular, that a blade associated with one of the circuits will be stationary in a stop position, waiting to be operated in order to accelerate at least one rank of products. When a blade is moved from the stop position for alignment and acceleration of the ranks towards the second conveyor belt, at least one other blade associated to the other of the two circuits is shifted into the stop position. In this way it is always possible to intervene for aligning an immediately subsequent rank.

A blade is moved from the stop position when a distance is detected that is equal to or greater than a pre-set distance between two adjacent ranks on the first conveyor belt, Moreover, a blade is moved from the stop position when there is detected a longitudinal dimension of a rank equal to or smaller than a pre-set length.

It is thus possible to select the ranks that may be properly aligned and space them from those that are, instead, so disorderly as not to enable intervention of the alignment device. The detection of such events is then used for directing in the direction of a separate conveying line the ranks that have not been aligned and spaced.

BRIEF DESCRIPTION OF THE DRAWINGS

Further characteristics and advantages of the present invention will emerge more clearly from the following description, which is provided purely by way of illustrative and non-limiting example, with reference to the attached drawings, in which:

FIG. 1 is a detailed elevation view of an alignment device in a plant according to a possible embodiment of the present invention, with a blade shown in various positions along the respective circuit;

FIG. 2 is an enlarged and simplified view of a detail of FIG. 1;

FIG. 3 is an enlarged and simplified view of another detail of FIG. 1;

FIGS. 4A–8A are schematic elevation views of some of the operating steps of a plant according to the present invention; and FIGS. 4B–8B are schematic plan views of the steps corresponding to those illustrated in FIGS. 4A–8A.

DETAILED DESCRIPTION OF THE INVENTION

Figure 6A:
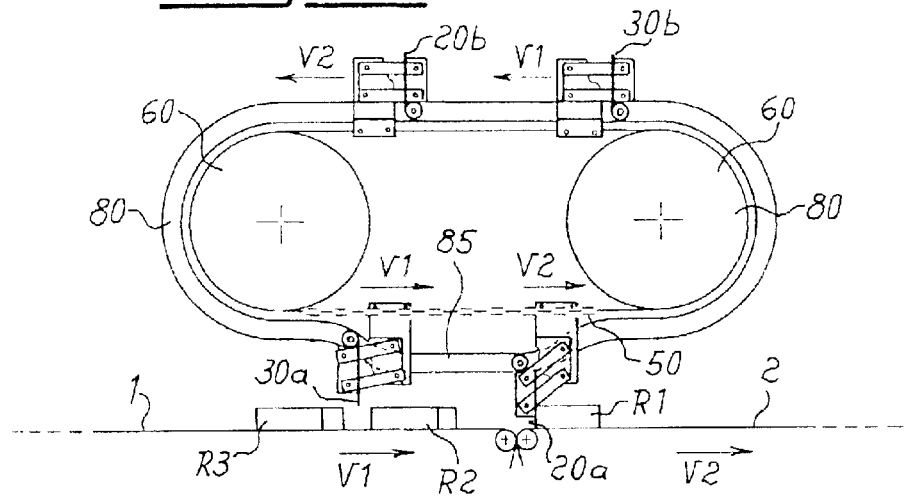

With reference to FIG. to 3. a plant according to the present invention comprises an alignment device 10 arranged along a packaging line between a first conveyor belt 1 and a second conveyor belt 2. The conveyor belts are set in motion in a continuous way with respective speeds V1 and V2 that are different from one another, in particular with the speed V2 of the belt 2 greater than the speed V1 of the belt 1. By appropriately regulating the speed of the belt 1 and of the belt 2 it is possible to impart the desired interval between consecutive ranks on the belt 2.

To accelerate the ranks of products from the belt 1 to the belt 2, there are provided one or more blades 20*a*, 20*b* and 30*a*, 30*b* (see, for example, FIGS. 4A–8A), of which FIG. 1 represents, for instance, just one, designated with the reference number 20*a*, in the various positions 201, 202, 203, 204, 205, 206, 207 and 208 of the respective circuit.

Upstream of the alignment device 10, in a position corresponding to the passage of the products on the conveyor belt 1, there are provided sensor means 5, which enable detection of information on the distance between the ranks of adjacent products and the space occupied by each rank on the first conveyor belt 1 in the longitudinal direction. This information is transmitted in the form of signals to a control unit (not shown), which accordingly controls the driving motors of the blades 20*a*, 20*b* and 30*a*, 30*b*.

The blades 20*a* and 20*b* are set in motion on a first circuit and driven by a first motor 120, while the blades 30*a* and 30*b* are set in motion on a second circuit, distinct from the first, by a second motor 130 driven independently of the first. The motors 120 and 130 may be. —for example, of the brushless type of in any case of any type which will enable control of speed and acceleration.

With reference now in particular to the views of FIGS. 2 and 3, each blade, for example the blade 20*a,* is mounted on a pair of supporting elements 40 (just one of which is visible in FIGS. 2 and 3) arranged at its ends. Each supporting element 40 comprises a portion with a parallelogram structure formed by arms 41 and 42. which are each hinged at one of their ends to a drawing block 43 and at the other of their ends to a block 44 for fixing of the blade 20*a.* This allows the blades 22*a,* 20*b,* 30*a,* 30*b* to be maintained in a position substantially perpendicular to the conveyor belts 1 and 2 at least in a position corresponding to the passage between one belt and the other, as shown for the blade 20*a* in FIG. 3 in the positions 204 and 205.

With particular reference to FIG. 2, in which the blade 20*a* is shown in the position 203, the drawing block 43 of each supporting element 40 is connected to a chain, represented schematically by the line 50 and is set in motion by a wheel 60 connected to one of the two motors 120 or 130, once again by means of belts or chains, represented schematically in FIG. 1 by respective dashed-and-dotted lines 121 and 131.

Each supporting element 40 comprises a follower member, namely a wheel 70 mounted on the arm 42, which bears in a mobile way upon a rail 80 for defining the path of the circuit of each blade. The rail 80 comprises, in particular, a portion 85 (FIG. 3), along which the blade is made to advance in the proximity of the belts 1 and 2 to enable accompaniment, during acceleration, of the ranks of products from the conveyor belt 1 to the conveyor belt 2. The portion of rail 85 thus defines an active portion of path along the circuit.

As a whole, considering the blades 20*a* and 20*b,* each blade is mounted at its ends on two supporting elements 40 fixed to two respective chains 50 placed between corresponding wheels 60. The blades 20*a* and 20*b* are spaced at equal distances along the chain (or along the circuit). The same applies to the blades 30*a* and 30*b,* which are, however, mounted on supports distinct from those of the blades 20*a* and 20*b,* as likewise the chains and the respective wheels are distinct.

FIGS. 4A and 4B illustrate one of the steps of the operating cycle of the plant. On the conveyor belt 1, which moves at a speed V1 three ranks R1, R2 and R3 are visible which are set with substantially disorderly alignment In the step represented, the blade 20*a* of the first circuit has already been set in motion at the same speed V1 as that of the belt 1. Since the blades 20*a* and 20*b* are connected to the same chain 50, they move at each instant according to the same law of motion.

The blade 30*a* associated to the second circuit is instead stationary in the waiting position occupied previously by the blade 20*a.* Also in this case, the blades 30*a* and 30*b* are connected to the same chain and obey the same law of motion.

Operation of the blade 20*a* is determined on the basis of the signals received from the sensor means 5 (FIG. 1) which have enabled determination of the conditions of intervention on the rank R1. In practice, to enable the alignment operation, the distance between the ranks R1 and R2 must be greater than a pre-set minimum distance, and the longitudinal dimension of the rank R1 must be equal to or smaller than a pre-set length. These pre-set parameters may also be varied according to the type and dimensions of the products to be treated.

The blade 20a which accompanies the rank R1 is then accelerated until it reaches at least a speed that is equal to or slightly higher than the speed V2 of the second conveyor belt 2, as indicated in FIGS. 5A and 5B, so as to enable alignment of the products in the rank R1 during their passage from the conveyor belt 1 to the conveyor belt 2. The blade 30a is, instead, still stationary, waiting to be actuated for one of the successive ranks.

Figure 6B:
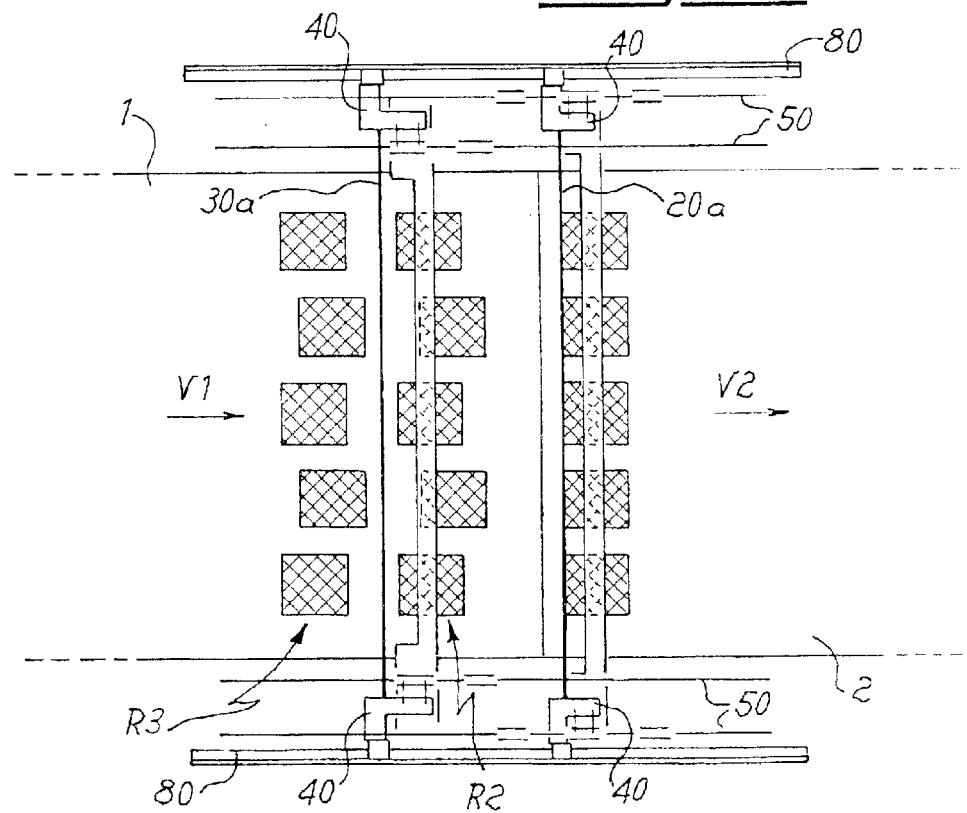

As may be noted in FIGS. 6A and 6B, the rank R1 is accompanied by the blade 20a on the conveyor belt 2 in a condition of perfect alignment, with the blade 20a which is kept in motion at the same speed V2 as that of the belt 2.

In this step, there moreover arises the condition for intervention on the next rank R2 by the blade 30a, which was previously at rest in the waiting condition. In other words, as already explained previously, the sensor means 5 (FIG. 1) have detected that the distance between the rank R2 and the rank R3 is greater than or equal to a pre-set distance and that the rank R2 has a longitudinal dimension that is equal to or smaller than a pre-set length.

The blade 30a is then operated to move towards the portion of rail 85 until it reaches the speed V1, to enable its insertion between the rank R2 and the rank R3. It should be noted that also the other blade 20b connected to the same chain to which the blade 20a is connected moves at a speed V2. and thus moves away from the blade 30b, which follows it at a lower speed V1, the latter blade being connected to the same chain to which the blade 30a is connected. Consequently, no interference can occur between the blades associated to the two distinct circuits, since the blade that precedes always moves at a speed higher than that of a blade that follows.

In FIGS. 7A and 7B there is represented the step in which the blade 30a moves at the speed V2 along the active portion of the circuit, namely in a position corresponding to the portion 85 of the rail 80, for aligning the rank R2 and accompanying it on the conveyor belt 2. The blade 30a is then lowered towards the conveyor belts 1 and 2 until it arrives in the proximity of the same and is made to advance into a substantially perpendicular position to enable its insertion in the free space between the ranks R2 and R3.

In this step, the blade 20a has already abandoned the active portion of the circuit and lifts up so as not to interfere with the rank R1 already aligned. The blade 20a is then accelerated up to a speed V3, greater than V1 and V2, to enable the other blade 20b of the same circuit to reach, in the shortest time possible, the waiting position, or stop position, that will enable possible intervention of the same blade 20b on the next rank R3. Also in this case, the blade 20b moves at a speed V3 greater than the speed V2 at which the blade 30b moves on the other circuit.

FIGS. 8A and 8B illustrate the situation immediately subsequent to the above, in which the blade 30a moves at a speed V2 during completion of the step of alignment of the rank R2 during transfer of the latter onto the conveyor belt 2, while the blade 20b has already reached its stop position and is hence stationary, waiting for the condition to arise for carrying out alignment of a subsequent rank, for example the rank R3 or any rank subsequent thereto for which the conditions already described previously with reference to the ranks R1 and R2 arise.

The embodiment of the plant according to the present invention has been illustrated herein purely by way of example and is not to be understood in a limiting sense. In particular, a plant according to the present invention may comprise two or more alignment devices, which are set along a packaging line between a number of consecutive conveyor belts driven at different speeds. This could enable the desired spacing of the ranks of products to be obtained on the final belt, limiting the variations in speed to which the various members in motion are subjected.

What is claimed is:

1. An alignment apparatus, comprising conveying means arranged to convey rows of products along a packaging line, supporting elements each with an articulated parallelogram structure to support at least one associated blade, means for moving the supporting elements about a closed path adjacent a selected row of articles, the articulated parallelogram structure moving the at least one associated blade into a path of the articles so that differences in speed of the blades urge the products of the rows into alignment.

2. A plant for carrying out orderly arrangement of products in ranks along a packaging line of the type comprising at least one alignment device arranged along said packaging line, and wherein said packaging line comprises at least one first conveyor belt, arranged upstream of said at least one alignment device, on which said products are set in ranks with substantially disorderly transverse alignment and with longitudinal distances that may vary between said ranks, and at least one second conveyor belt, arranged downstream to of said at least one alignment device, on which said products must be set aligned according to orderly ranks spaced at pre-set distances, characterized in that said alignment device comprises means for accelerating, by increasing speed, said ranks of products during their passage from said first conveyor belt to said second conveyor belt; and means for detecting at least the distance between adjacent ranks on said first conveyor belt.

3. A plant for carrying out orderly arrangement of products in ranks along a packaging line of the type comprising at least one alignment device arranged along said packaging line, and wherein said packaging line comprises at least one first conveyor belt, arranged upstream of said at least one alignment device, on which said products are set in ranks with substantially disorderly transverse alignment and with longitudinal distances that may vary between said ranks, and at least one second conveyor belt, arranged downstream to of said at least one alignment device, on which said products must be set aligned according to orderly rank spaced at pre-set distances, characterized in that said alignment device comprises means for accelerating, by increasing speed, said ranks of products during their passage from said first conveyor belt to said second conveyor belt; and means for detecting at least the space occupied by each rank on said first conveyor belt in the longitudinal direction.

4. A plant for carrying out orderly arrangement of products in ranks along a packaging line of the type comprising at least one alignment device arranged along said packaging line, and wherein said packaging line comprises at least one first conveyor belt, arranged upstream of said at least one alignment device, on which said products are set in ranks with substantial disorderly transverse alignment and with longitudinal distances that may vary between said ranks, and at least one second conveyor belt, arranged downstream to of said at least one alignment device, on which said products must be set aligned according to orderly ranks spaced at pre-set distances, characterized in that said alignment device comprises means for accelerating, by increasing speed, said ranks of products during their passage from said first conveyor belt to said second conveyor belt, said means for accelerating said ranks of products comprises one or more blades set in motion along at least one respective pre-set circuit by means of a motor driven in a controlled way; and said means for accelerating said ranks of products comprise one or more distinct circuits on each of which at least two of said blades are set in motion.

5. A plant according to claim 4, wherein the blades of a circuit are set in motion by a motor controlled independently with respect to the one associated to another of said circuits.

6. A plant according to claim 4, wherein each of said circuits comprises at least one active portion of path along which each of said blades is made to advance with an edge in the proximity of the surface of said conveyor belts for accompanying a rank of said products in their passage from said first conveyor belt to said second conveyor belt.

7. A plant for carrying out orderly arrangement of products in ranks along a packaging line of the type comprising at least one alignment device arranged along said packaging line, and wherein said packaging line comprises at least one first conveyor belt, arranged upstream of said at least one alignment device, on which said products are set in ranks with substantially disorderly transverse alignment and with longitudinal distances that may vary between said ranks, and at least one second conveyor belt, arranged downstream to of said at least one alignment device, on which said products must be set aligned according to orderly ranks spaced at pre-set distances, characterized in that said alignment device comprises means for accelerating, by increasing speed, said ranks of products during their passage from said first conveyor belt to said second conveyor belt, said means for accelerating said ranks of products comprise one or more blades set in motion along at least one respective pre-set circuit by means of a motor driven in a controlled way; each of said circuits comprises at least one guide rail designed to define the path of the respective circuit, and at least one follower member bears in a mobile way upon said rail and which is integral with at least one supporting element for each of said blades.

8. A plant according to claim 4, wherein supporting elements for said two blades in each circuit are connected to at least one drive chain, said two blades in each circuit being mounted in equidistant positions on said drive chain.

9. A plant for carrying out orderly arrangement of products in ranks along a packaging line of the type comprising at least one alignment device arranged along said packaging line, and wherein said packaging line comprises at least one first conveyor belt, arranged upstream of said at least one alignment device, on which said products are set in ranks with substantially disorderly transverse alignment and with logitudinal distances that may vary between said ranks, and at least one second conveyor belt, arranged downstream to of said at least one alignment device, on which said products must be set aligned according to orderly ranks spaced at pre-set distances, characterized in that said alignment device comprises means for accelerating, by increasing speed, said ranks of products during their passage from said first conveyor belt to said second conveyor belt, said means for accelerating said ranks of products comprise one or more blades set in motion along at least one respective pre-set circuit by means of a motor driven in a controlled way; and said blades are mounted on at least one supporting element having an articulated-parallelogram portion for maintaining said blades in a position substantially perpendicular to said conveyor belts at least in correspondence of said active portion of path.

10. A method for aligning comprising conveying rows of products along a packaging line, supporting blades with supporting elements each with an articulated parallelogram structure to support at least one associated blade, moving the supporting elements about a closed path adjacent a selected row of articles, the articulated parallelogram structure moving the at least one associated blade into a path of the articles so that differences in speed of the blades urge the products of the rows into alignment.

11. A method for carrying out orderly arrangement of products in ranks along a packaging line, comprising arranging at least one first conveyor belt upstream of at least one alignment device, on which said products are set in ranks with substantially disorderly transverse alignment and with longitudinal distances that may vary between said ranks, and arranging at least one second conveyor belt downstream of said at least one alignment device, on which said products must be set aligned according to orderly ranks spaced at pre-set distances, characterized by accelerating, by increasing speed, said ranks of products during their passage from said first conveyor belt to said second conveyor belt; and detecting at least a distance between adjacent ranks on said first conveyor belt.

12. A method for carrying out orderly arrangement of products in ranks along a packaging line, comprising arranging at least one first conveyor belt upstream of at least one alignment device, on which said products are set in ranks with substantially disorderly transverse alignment and with longitudinal distances that may vary between said ranks, and arranging at least one second conveyor belt downstream of said at least one alignment device, on which said products must be set aligned according to orderly ranks spaced at pre-set distances, characterized by accelerating, by increasing speed, said ranks of products during their passage from said first conveyor belt to said second conveyor belt; and detecting at least-space occupied by each rank on said first conveyor belt in a longitudinal direction.

13. A method according to claim 10, further comprising providing one or more distinct circuits, and setting in motion at least two of said blades on each of the one or more distinct circuits.

14. A method according to claim 13, wherein setting in motion of the blades of one of the distinct circuits is by a motor controlled independently of the blades associated with another of said distinct circuits.

15. A method according to claim 13, further comprising advancing each of said blades along at least one active portion of path of associated ones of said distinct circuits with an edge of said blades in-proximity of a surface of said conveyor belts for accompanying a rank of said products in their passage from said first conveyor belt to said second conveyor belt.

16. A method according claim 10, wherein the conveying is with conveyor belts, further comprising advancing said blades in a position substantially perpendicular to said conveyor belts at least in correspondence with an active portion of path.

17. A method according claim 13, wherein each of said distinct circuits comprises at least a stop position, in correspondence of which at least one blade is stationary waiting to be actuated for accelerating at least one rank of said products, said stop position being set in the proximity of an active portion of a circuit and immediately upstream of said active portion.

18. A method according to claim 13, wherein, when moving a blade of one of said distinct circuits from said of least one stop position towards an active portion of said one of said distinct circuits, at least one other blade of the other at said distinct circuits shifts into said stop position.

19. A method according to claim 10, wherein the conveying is with a conveyor belt upstream of the aligning, further comprising moving said at least one associated blade from at least one stop position towards an active portion of a circuit when detecting a distance equal to or greater than a pre-set distance between two adjacent ranks on said conveyor belt.

20. A method according to claim 10, further comprising moving said at least one associated blade from at least one stop position towards an active portion of a circuit when detecting a longitudinal dimension of a rank equal to or smaller than a pre-set length.

21. A method according to claim 10, wherein the conveying is with a second conveyor belt downstream of the aligning, further comprising accelerating a said at least one associated blade along said active portion of circuit until reaching a speed equal to or higher than a speed of said conveyor belt.

* * * * *